(12) United States Patent
Sakurai et al.

(10) Patent No.: US 7,618,200 B2
(45) Date of Patent: Nov. 17, 2009

(54) PHOTOELECTRIC COUPLING ASSEMBLY AND MANUFACTURING METHOD THEREOF

(75) Inventors: Wataru Sakurai, Kanagawa (JP); Kazuhito Saito, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 10 days.

(21) Appl. No.: 11/866,596

(22) Filed: Oct. 3, 2007

(65) Prior Publication Data

US 2008/0095505 A1  Apr. 24, 2008

(30) Foreign Application Priority Data

Oct. 19, 2006  (JP) .............................. 2006-284845

(51) Int. Cl.
*G02B 6/36* (2006.01)
(52) U.S. Cl. ............................. 385/89; 385/90; 385/91; 385/92; 385/93; 385/94
(58) Field of Classification Search ............ 385/89–92, 385/49, 94, 52
See application file for complete search history.

(56) References Cited

U.S. PATENT DOCUMENTS

| | | | | |
|---|---|---|---|---|
| 3,755,089 A | * | 8/1973 | Rapids | ........................ 205/117 |
| 6,517,259 B1 | * | 2/2003 | Murata | ........................ 385/92 |
| 7,118,294 B2 | | 10/2006 | Hamasaki et al. | |
| 7,198,412 B2 | * | 4/2007 | Hamasaki et al. | ............. 385/88 |
| 7,352,935 B2 | * | 4/2008 | Furuyama et al. | ............. 385/52 |
| 2007/0165986 A1 | | 7/2007 | Sakurai et al. | |

FOREIGN PATENT DOCUMENTS

| | | |
|---|---|---|
| JP | 2005-43622 A | 2/2005 |
| JP | 2007-171306 A | 7/2007 |

\* cited by examiner

*Primary Examiner*—Brian M. Healy
*Assistant Examiner*—Guy G Anderson
(74) *Attorney, Agent, or Firm*—Global IP Counselors, LLP (57) ABSTRACT

A photoelectric coupling assembly and manufacturing method thereof enabling a three dimensional electrical wiring pattern is provided. The assembly includes a photoelectric conversion unit equipped with a photoelectric conversion element and a molded article. The molded article has a hole configured and arranged to have an optical fiber inserted there-through such that a distal end of the fiber faces an active layer of the conversion element, a front surface on which the conversion unit is mounted, and a side surface being contiguous to the front surface. The lead being insert molded into the molded article has a first surface being exposed at the front surface and electrically connected to the conversion element, a second surface being exposed at the side surface, and an engaging portion having a width increasing in a direction away from the front surface. At least a portion of the engaging portion is contained inside the resin forming the molded article.

11 Claims, 6 Drawing Sheets

PHOTOELECTRIC COUPLING ASSEMBLY AND MANUFACTURING METHOD THEREOF

BACKGROUND OF THE INVENTION

1. Field of the Invention

The present invention relates to a photoelectric coupling assembly for connecting an electrical circuit and an optical fiber and a method for manufacturing the photoelectric coupling assembly.

2. Description of the Background Arts

With the development of broadband communication systems, higher speeds and larger capacities are increasingly in demand for networked household electric appliances as well as for routers at network nodes. Consequently, the investigation and implementation of optical interconnections is on the rise. An optical interconnection is a connection arrangement contrived to carry out a photoelectric conversion at a boundary section (interface) between a signal processing section and a signal transmission section such that the broadband capacity of optical fiber technology can be utilized to accomplish high-speed, high-capacity transmissions. Japanese Laid-Open Patent Application Publication No. 2005-43622, for example, discloses a technique in which an electrical circuit and an optical fiber are coupled together at a photoelectric conversion section using a photoelectric coupling assembly that includes a photoelectric conversion element (a light-emitting element or a light-receiving element) and an optical fiber holding member.

Figure 11:
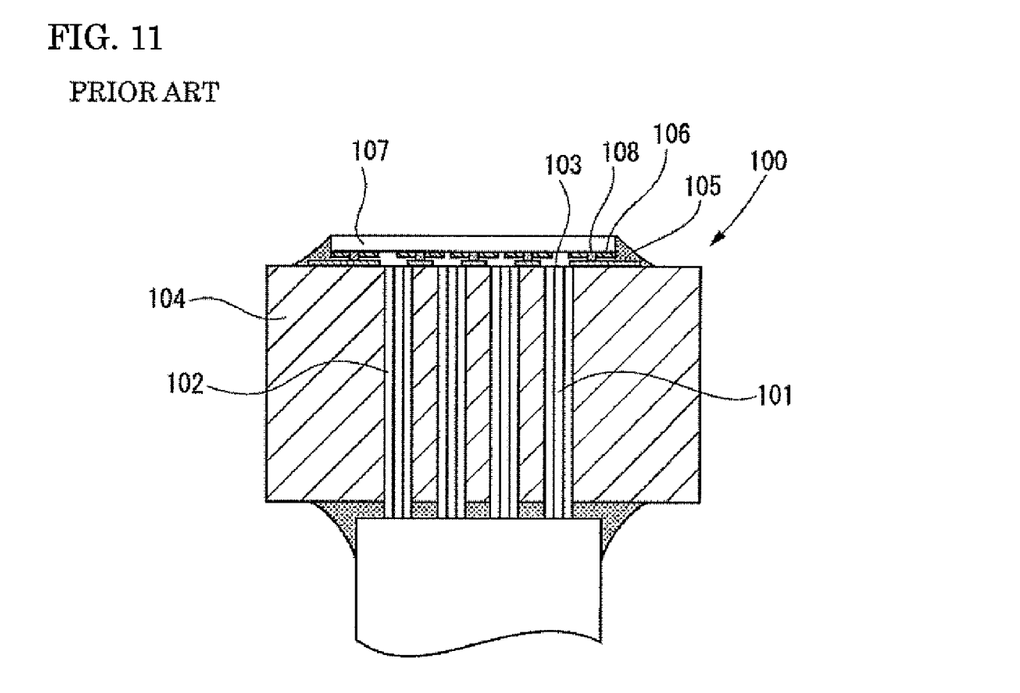
FIG. 11 is a cross sectional view showing a conventional photoelectric coupling assembly with optical fibers assembled thereto.

FIG. 11 is a cross sectional view showing the assembled state of an optical fiber cable connected to a photoelectric coupling assembly in accordance with the disclosure of Japanese Laid-Open Patent Application Publication No. 2005-43622. The photoelectric coupling assembly 100 includes a molded article 104 having holding holes 102 each configured to mechanically hold an optical fiber 101 such that an optical input/output end surface 103 of each optical fiber 101 is exposed at a main surface. An electrical wiring pattern 105 is provided on the main surface and a side surface of the molded article 104 such that the portion of the electrical wiring pattern 105 on the main surface is connected to the portion of the electrical wiring pattern 105 on the side surface. A photo-semiconductor element 107 is provided in front of the optical fiber 101 with an insulating film 106 disposed there-between. The photo-semiconductor element 107 is connected to the electrical wiring pattern 105 with bumps 108. The same patent publication claims that the degree of freedom with which the photo-electric coupling assembly can be arranged is increased by having the kind of electrical wiring pattern just described However, it is inherently difficult to form an electrical wiring pattern in a continuous manner on the surface of an object such that the wiring pattern is accurately positioned in three dimensions.

SUMMARY OF THE INVENTION

The object of the present invention is to provide a photoelectric coupling assembly and a manufacturing method thereof that are contrived such that the electrical wiring pattern can be positioned accurately in three dimensions.

In order to achieve the object, the invention provides a photoelectric coupling assembly that comprises: (1) a photoelectric conversion unit equipped with a photoelectric conversion element; and (2) a molded article. The molded article includes a front surface on which the photoelectric conversion unit is mounted and an optical fiber insertion hole configured and arranged to have an optical fiber inserted therethrough such that a distal end of the optical fiber faces an active layer of the photoelectric conversion element. A lead is insert molded into the molded article. The lead has a first surface that is exposed at the front surface of the molded article and electrically connected to the photoelectric conversion element, a second surface that is exposed at a side surface of the molded article that continuously adjoins the front surface of the molded article, and an engaging portion having a width that increases in a direction away from the front surface of the molded article. At least a portion of the engaging portion is contained inside the resin that forms the molded article. The "width" of the lead is the dimension of the lead in a direction perpendicular to the lengthwise direction of the lead and the direction away from the front surface of the molded article.

Another aspect of the present invention provides a method for manufacturing a photoelectric coupling assembly that comprises: (1) a photoelectric conversion unit equipped with a photoelectric conversion element; and (2) a molded article equipped with an optical fiber insertion hole that is configured and arranged to have an optical fiber inserted there-through such that a distal end of the optical fiber faces an active layer of the photoelectric conversion element, a front surface on which the photoelectric conversion unit is mounted, and a lead that is electrically connected to the photoelectric conversion element and has an engaging portion having a width that increases in a direction away from the front surface of the molded article. In this manufacturing method, (1) a lead frame is insert molded to the front surface of the molded article such that the engaging portion is contained inside the resin forming the molded article and a first surface of the lead is exposed at the front surface of the molded article and (2) the lead frame is cut such that a second surface of the lead is exposed at a side surface of the molded article that contiguously adjoins the front surface of the molded article.

In a photoelectric coupling assembly and manufacturing method thereof according to the present invention, it is acceptable to form the engaging portion by using etching to form a lead forming pattern in the lead frame. It is also acceptable for the lead to be configured such that a thickness thereof varies. The thickness variation of the lead can be formed by etching or plating. It is acceptable for a width of the first surface to vary with respect to a direction perpendicular to the width. The "thickness" of the lead is the longitudinal dimension of the lead in a direction perpendicular to the front surface of the molded article.

DETAILED DESCRIPTION OF THE INVENTION

The above-mentioned features and other features, aspects, and advantages of the present invention will be better understood through the following description, appended claims, and accompanying drawings. In the explanation of the drawings, identical reference numerals are applied to identical elements and duplicate explanations are omitted.

Figure 1:
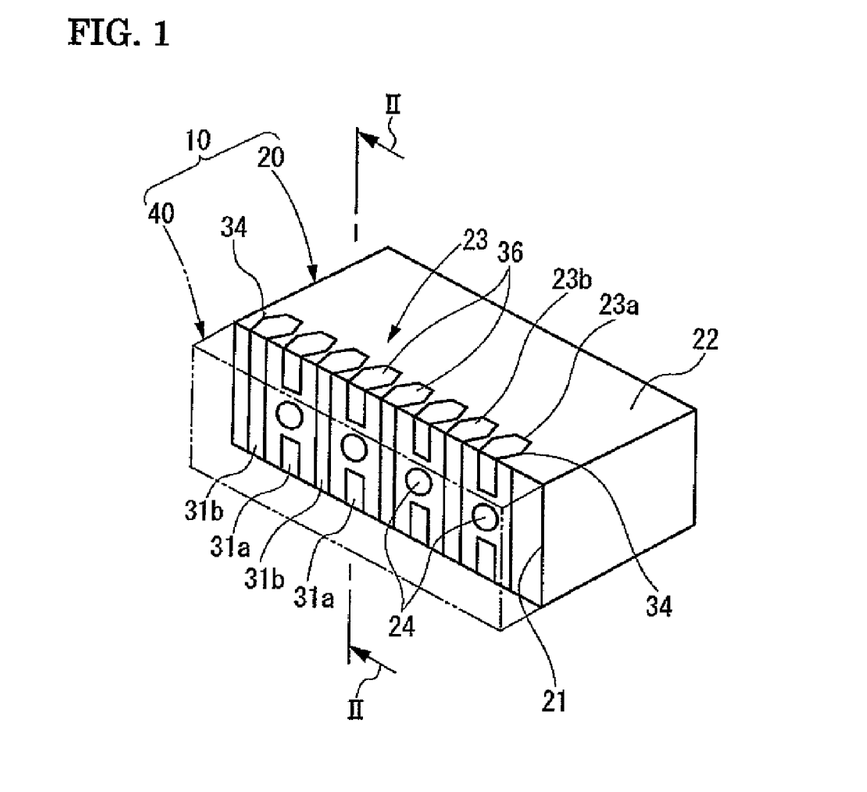
FIG. 1 is a perspective view of a molded article of a photoelectric coupling assembly in accordance with an embodiment of the present invention.

FIG. 1 is a perspective view of a molded article of a photoelectric coupling assembly in accordance with an embodiment of the present invention. The photoelectric coupling assembly 10 includes a main unit (molded article) 20 whose overall shape is generally cuboids and a photoelectric conversion unit 40 that is mounted to a front surface 21 of the main unit 20. The main unit 20 has a plurality of optical fiber insertion holes 24, each of which is configured and arranged to receive an optical fiber 11 there-through with a distal end 11b of the optical fiber facing an active layer of a photoelectric conversion element of the photoelectric conversion unit 40. The main unit 20 also has a front surface 21 on which the photoelectric conversion unit 40 is mounted. An electrical wiring pattern section 23 is provided across the front surface 21 of the main unit 20 and a side surface 22 (e.g., top and bottom surfaces) that is contiguous with the front surface 21. The electrical wiring pattern section 23 comprises alternately arranged short electrical wires 23a and long electrical wires 23b. The optical fiber insertion holes 24 are arranged between the short electrical wires 23a.

Figure 2:
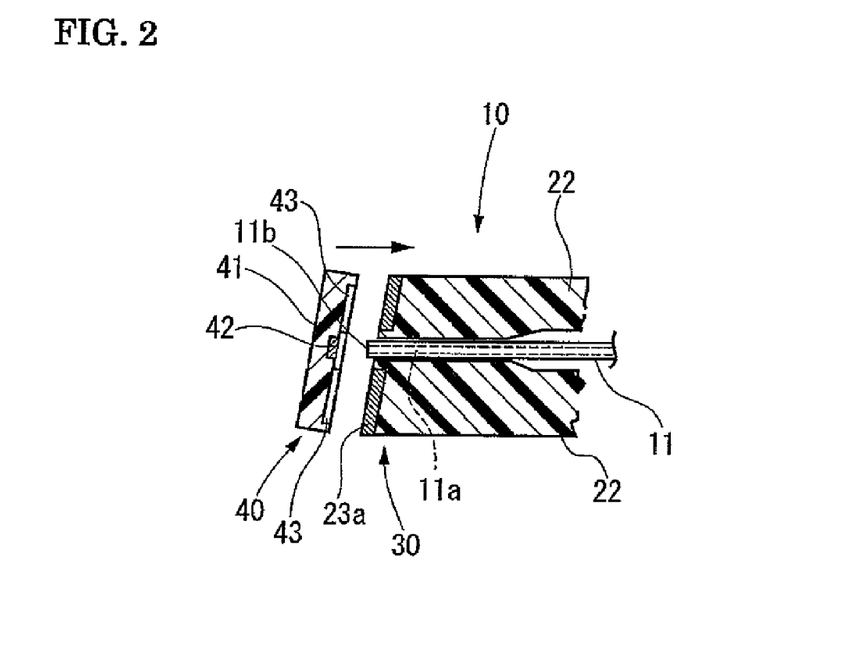
FIG. 2 is a partial cross sectional view of the photoelectric coupling assembly at the section line II-II in FIG. 1 and shows the distal end of the photoelectric coupling assembly.

FIG. 2 is a partial cross sectional view of the photoelectric coupling assembly 10 at the section line II-II in FIG. 1 and shows the distal end of the photoelectric coupling assembly 10. The photoelectric conversion unit 40 has a photoelectric conversion element 41 and an active layer 42 of the photoelectric conversion unit 40 is positioned so as to face the optical fiber insertion holes 24 of the main unit 20. The photoelectric conversion unit 40 is provided with electrodes 43 for supplying electricity to the active layer 42 or transmitting a signal from the active layer 42. When the photoelectric conversion unit 40 is mounted to the front surface 21 of the main unit 20, the electrodes 43 contact the electrical wiring pattern section 23 of the main unit 20.

Figure 3:
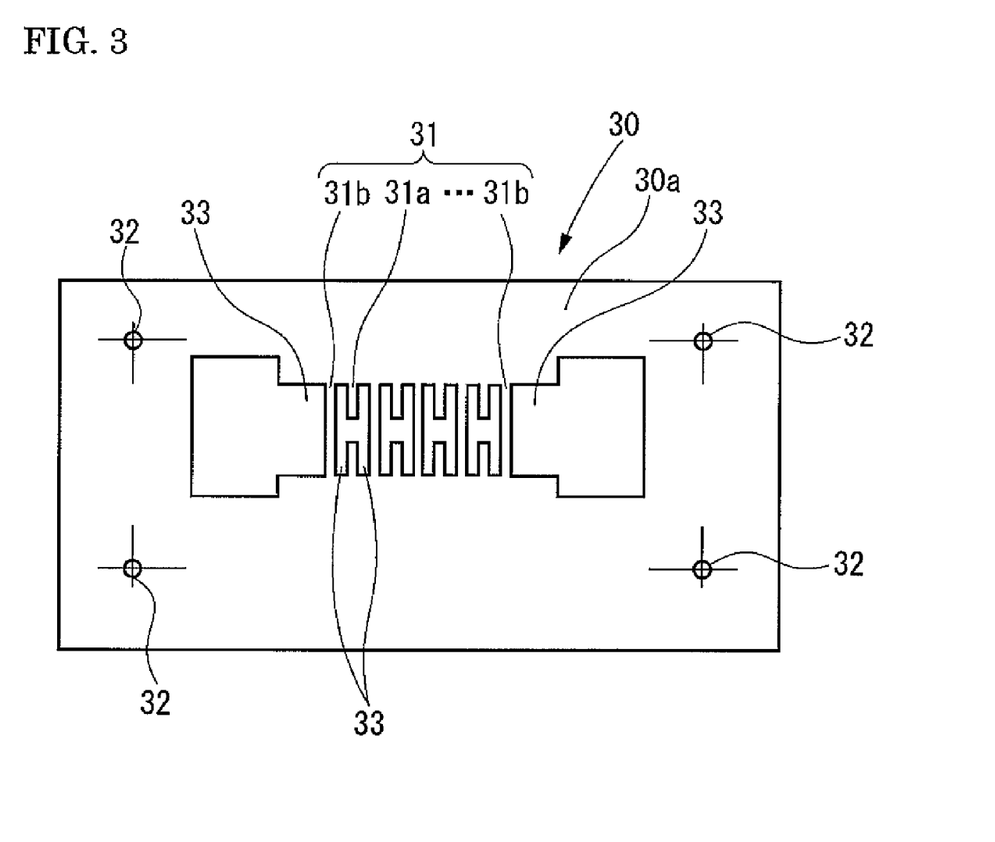
FIG. 3 is a top plan view of a lead frame used in a photoelectric coupling assembly in accordance with the present invention.

FIG. 3 is a top plan view of a lead frame used in a photoelectric coupling assembly in accordance with the present invention. The lead frame 30 has a lead forming pattern 31 to be the electrical wiring pattern section 23. The lead forming pattern 31 has short leads 31a to be the short electrical wires 23a and long leads 31b to be the long electrical wires 23b. Spaces 33 where the lead frame 30 has been cut out are disposed between and on the outsides of the leads 31a and 31b. During molding, resin 59 fills the spaces 33 and the lead frame 30 is insert molded into the main unit 20. Positioning holes 32 for positioning the lead frame 30 are provided at the four corners of the lead forming pattern 31.

The leads 31a and 31b are fine (very narrow). For example, if the pitch at which the optical fibers 11 are arranged is 250 μm, then the widths of the leads 31a and 31b will be approximately 50 μm. Consequently, it is difficult to ensure the shear strength of the insert-molded leads. Additionally, the leads 31a and 31b are cut in accordance with the shape of the molded article 20 after the insert molding process and the cut surfaces of the leads 31a and 31b are exposed at the side surface 22 so as to form electrode terminals 36. Since the surface area of the cut surface of each electrode terminal 36 is only the product of the lead thickness and the lead width, there is the possibility that poor electrical connections would result in the completed photoelectric coupling assembly if these cut surfaces alone were used as contacts.

Therefore, in a photoelectric coupling assembly in accordance with this embodiment, the leads 31a and 31b are each configured and arranged to have a first surface that is exposed at the front surface 21 of the molded article 20 and electrically connected to the photoelectric conversion element and a second surface that is exposed at a side surface 22 of the molded article 20, the side surface 22 being contiguous with the front surface 21. Additionally, by providing each of the leads 31a and 31b with a wide section 34 having a width W1 that is wider than the width W0 at the front surface 21 of the molded article 20, an engaging portion is formed that has a width that increases in a direction away from the front surface 21 of the molded article 20. The leads 31a and 31b are insert molded into the front surface 21 of the molded article 20 such that at least a portion of the engaging portion of each is contained inside the resin 20a forming the molded article 20. The leads 31a and 31b are also cut from the lead frame 30 such that an end face of each (which constitutes a portion of each) is exposed at the side surface 22 of the molded article 20, which is contiguous with the front surface 21.

Figure 4A:
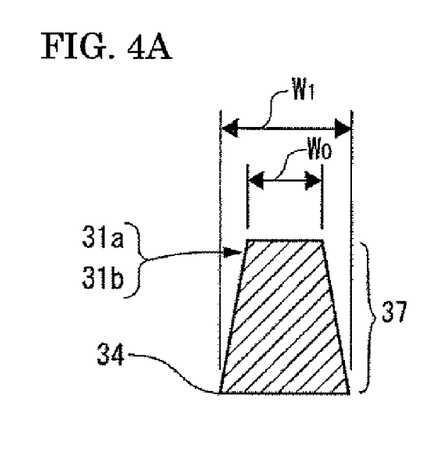
FIGS. 4A and 4B are cross sectional views showing examples of leads used in a photoelectric coupling assembly in accordance with the present invention.
Figure 4B:
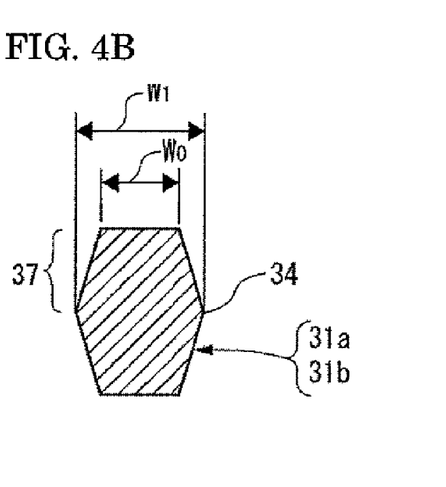
Figure 5A:
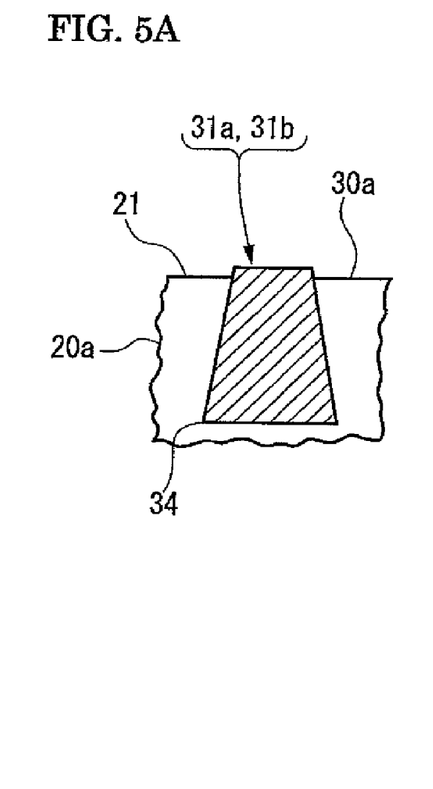
FIGS. 5A and 5B are cross sectional views showing the insert molded states of the leads shown in FIGS. 4A and 4B.
Figure 5B:
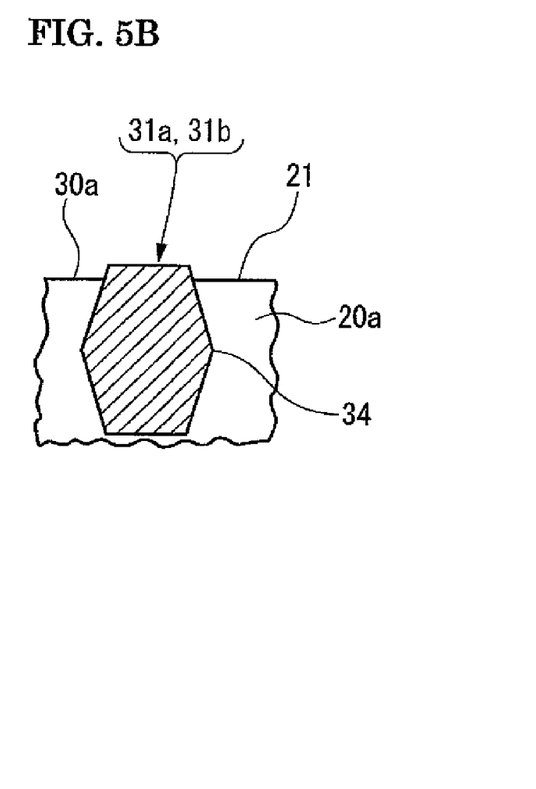

FIGS. 4A and 4B are cross sectional views showing examples of leads used in a photoelectric coupling assembly in accordance with the present invention and FIGS. 5A and 5B are cross sectional views showing the insert molded states of the leads. FIGS. 4A and 5A show a lead 31a or 31b having a trapezoidal cross sectional shape. The bottom side of the trapezoid has a larger width than the top side and constitutes the wide section 34. Thus, the entire lead 31a or 31b forms the engaging portion 37. The top side of the insert molded lead 31a or 31b is exposed from the resin 20a, and a portion of the engaging portion 37 is embedded in the resin 20a. In this way, the lead 31a or 31b is reliably insert molded into the front surface 21 of the molded article 20.

FIGS. 4B and 5B show a lead 31a or 31b having a hexagonal cross sectional shape. The wide section 34 is provided in the middle such that the portion from the front surface 21 to the middle corms the engaging portion 37. The top side of the insert molded lead 31a or 31b is exposed from the resin 20a, and a portion of the engaging portion 37 is embedded in the resin 20a. In this way, the lead 31a or 31b is reliably insert molded into the front surface 21 of the molded article 20.

The engaging portion of the lead 31a or 31b shown in FIG. 4A can be formed easily by, for example, forming a mask film on one side of a thin copper plate and etching the copper plate from one side. The engaging portion of the lead 31a or 31b shown in FIG. 4B can be formed easily by, for example, forming a mask film on both sides of a thin copper plate and etching the copper plate from both sides.

Figure 6A:
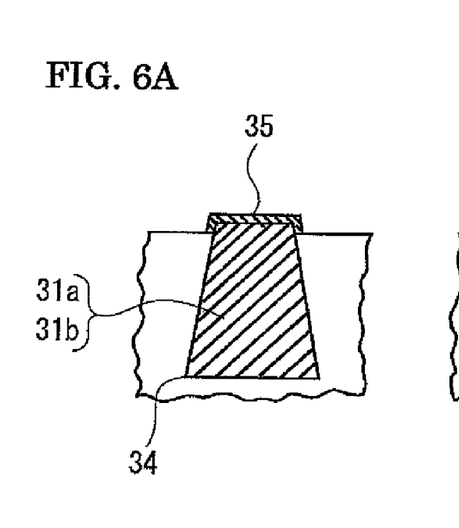
FIGS. 6A and 6B are cross sectional views showing examples of leads with plated surfaces used in a photoelectric coupling assembly in accordance with the present invention.
Figure 6B:
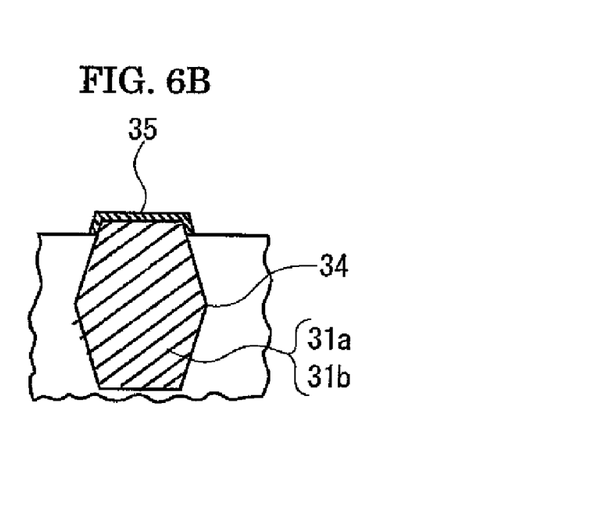

It is preferred to apply plating onto the surface of the leads 31a and 31b after insert molding in preparation for wire bonding. FIGS. 6A and 6B show cross sectional views of each of the leads 31a or 31b shown in FIGS. 4 and 5 with a plating 35 applied to the surface thereof. The plating 35 comprises a layer of nickel (Ni) (applied first) and a layer of gold (Au) (applied second) that are applied to the surface of the lead 31a or 31b with a non-electrolytic plating method.

Figure 7:
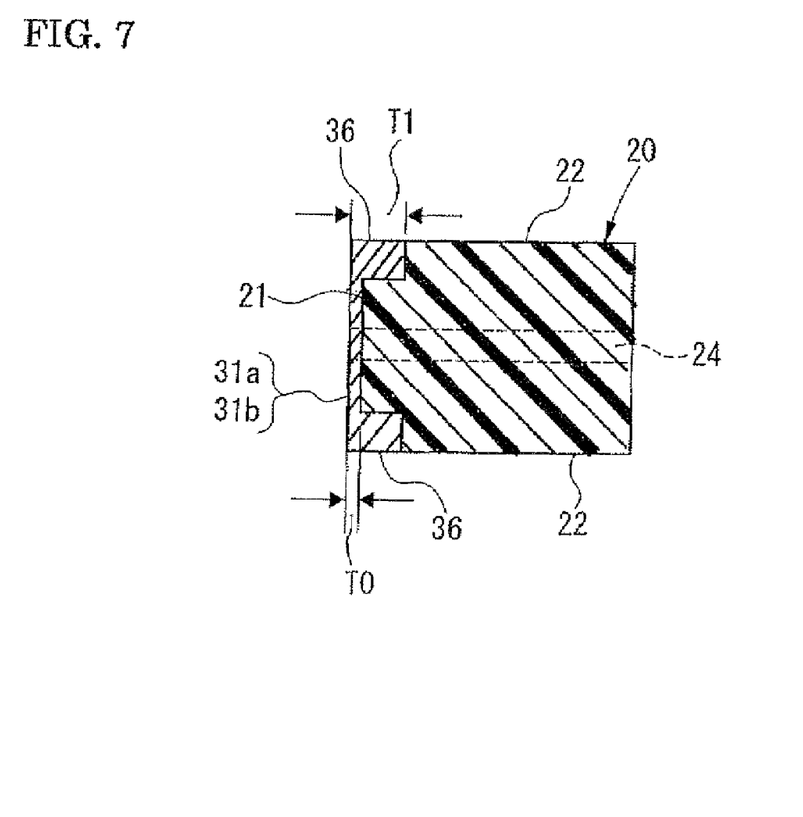
FIG. 7 is a longitudinal cross sectional view of a molded article of a photoelectric coupling assembly in accordance an embodiment of the present invention. The cross section lies in a plane that is parallel to an optical fiber insertion hole and includes a lead.

It is also acceptable for the lead to be configured such that a thickness thereof varies. FIG. 7 is a longitudinal cross sectional view of a molded article 20 of a photoelectric coupling assembly 10. The cross section lies in a plane that is parallel to an optical fiber insertion hole 24 and includes a lead 31a or 31b. The thickness T1 of the top and bottom end sections of the lead 31a or 31b is larger than the thickness T0 of the general section such that the electrode terminal 36 exposed on the side surface 22 of the molded article 20 is larger. Increasing the thickness of the lead 31a or 31b in at the top and bottom in this way makes the lead 31a or 31b less likely to become detached from the molded article 20 when a vertical force (upward or downward force) acts on the lead 31a or 31b. The increased thickness also makes it easier to accomplish wire bonding and enables three-dimensional wiring to be accomplished in a reliable manner, thereby increasing the degree of freedom with respect to packaging configurations. Thus, when the photoelectric coupling assembly 10 is mounted on a substrate (not shown), the end faces of the leads 31a and 31b, i.e., the electrode terminals 36, contact the terminals of the substrate in a reliable manner.

The thickness variation of the lead can be formed by etching or plating. When the thickness variation is formed by etching, half etching is applied to the lead frame such that the portions other than the end sections of the leads 31a and 31b are made to be thinner.

Figure 8A:
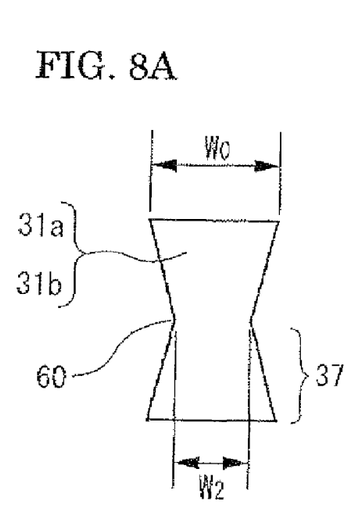
FIGS. 8A and 8B are cross sectional views showing other examples of leads used in a photoelectric coupling assembly in accordance with the present invention.
Figure 8B:
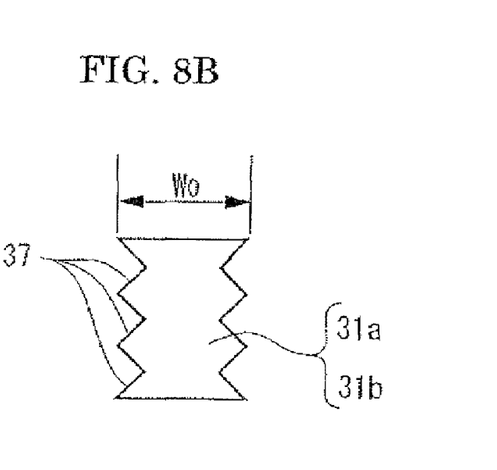

FIGS. 8A and 8B are cross sectional views showing other examples of leads used in a photoelectric coupling assembly in accordance with the present invention. The lead 31a or 31b shown in FIG. 8A is configured to have a narrow section 60 having a width W2 that is smaller than the width W0 at the surface 30a of the lead frame 30. The lead 31a or 31b shown in FIG. 8B has a bellows-like cross sectional shape. In either case, an engaging portion 37 whose width increases in a direction away from the front surface 21 is obtained. The method of manufacturing the leads shown in FIGS. 8A and 8B is the same as the method of manufacturing the leads shown in FIG. 4.

Figure 9A:
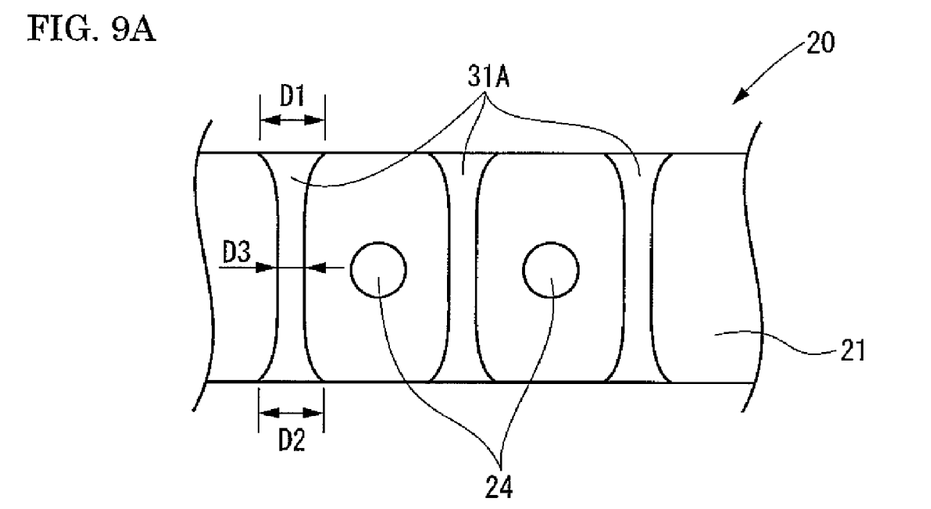
FIGS. 9A and 9B are frontal views showing other examples of leads used in a photoelectric coupling assembly in accordance with the present invention as seen from the front surface of the molded article.
Figure 9B:
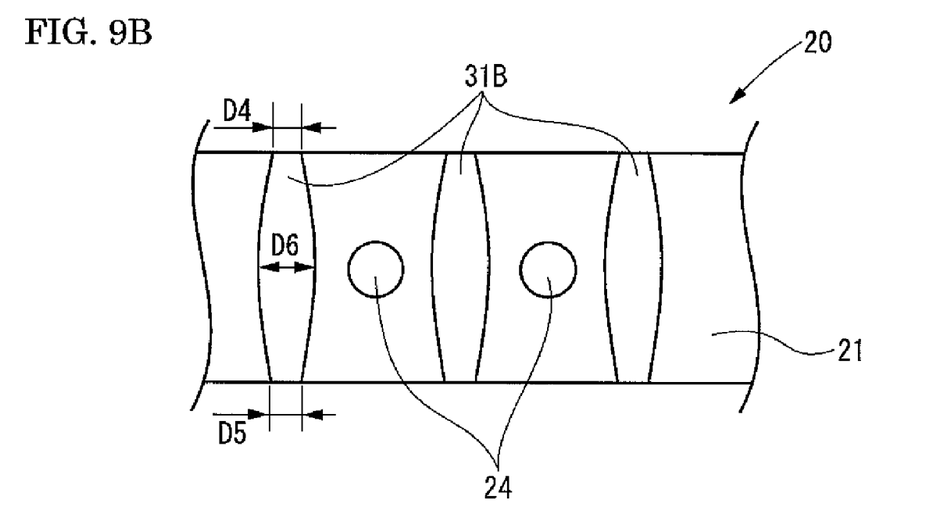

FIGS. 9A and 9B are frontal views showing other examples of leads used in a photoelectric coupling assembly in accordance with the present invention as seen from the front surface 21 of the molded article 20 (first surface of the lead). It is acceptable for the width of the first surface to vary with respect to a direction perpendicular to the width. In the example shown in FIG. 9A, the leads 31A are arranged in the front surface 21 of the molded article 20 with a prescribed spacing between one another and the optical fiber insertion holes 24 are provided in-between the leads 31A. Each of the leads 31A is configured such that the width thereof at the front surface 21 varies as one moves along a direction perpendicular to the widthwise direction in the plane of the front surface 21. More specifically, each of the leads 31A has a wide section D1 at an upper side and a wide section D2 at a lower side along said perpendicular direction (vertical direction in FIG. 9). Additionally, each lead 31A has a narrow section D3 at an intermediate portion along the vertical direction. Conversely, in the example shown in FIG. 9B, each of the leads 31B is configured to have a narrow section D4 at an upper side and a narrow section D5 at a lower side along said perpendicular direction (vertical direction in FIG. 9). Additionally, each lead 31B has a wide section D6 at an intermediate portion along the vertical direction.

Configuring the leads 31B such that the widths thereof vary as one moves along a direction perpendicular to the width of the lead 31B in the plane of the lead surface makes the leads 31B less likely to become detached from the molded article 20 when a force acts on a lead 31B in a direction perpendicular to the widthwise direction of the lead 31B in the plane of the lead surface. It is acceptable for the variation of the lead width to be either continuous or discontinuous. A lead having a varied width can be fabricated, for example, by etching.

Figure 10:
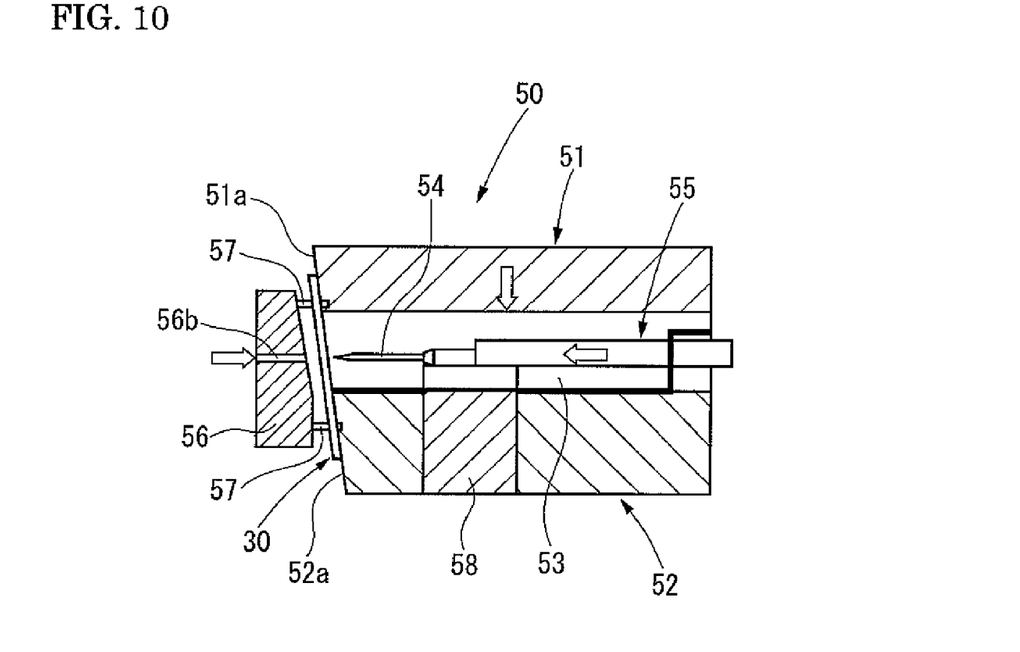
FIG. 10 is a cross sectional view illustrating a photoelectric coupling assembly being insert molded in accordance with an embodiment of a manufacturing method for a photoelectric coupling assembly in accordance with the present invention.

A mold used in a manufacturing method for a photoelectric coupling assembly in accordance with the present invention will now be explained. FIG. 10 is a cross sectional view illustrating a photoelectric coupling assembly being insert molded in accordance with an embodiment of a manufacturing method for a photoelectric coupling assembly in accordance with the present invention. The mold 50 has an upper die 51 and a lower die 52. When the upper and lower dies 51 and 52 are joined together, a cavity 53 is formed inside for forming the main unit 20 of the photoelectric coupling assembly 10. A second slide core 56 is positioned on the frontward side (leftward side in FIG. 10) of the upper and lower dies 51 and 52 with positioning pins 57 such that it faces toward a first slide core 55. The second slide core 56 forms a front surface 21 on the molded article 20 from which the distal ends 11a of the optical fibers 11 are exposed.

The first slide core 55 has a plurality of core pins 54 for forming the insertion holes 24 (through which the optical fibers 11 will be passed) in the molded article 20 and is inserted between the upper and lower molds 51 and 52. A protruding part 58 for adjusting the height of the first slide core 55 is fitted inside a middle portion of the lower die 52 such that the vertical position thereof can be adjusted. The protruding part 58 is arranged to adjust the height of the first slide core 55 by supporting the first slide core 55 from underneath. The protruding part 58 also forms an adhesive injection port through which an adhesive is injected to fasten the optical fiber 11 inside the photoelectric coupling assembly.

A manufacturing method for a photoelectric coupling assembly in accordance with the present invention will now be explained. In this manufacturing method, leads each of which has an engaging portion and supplies electricity to a photoelectric conversion element arranged facing toward the respective optical fiber are insert molded into a front surface and a side surface, which is contiguous with respect to the front surface, of the molded article which is configured to have optical fibers passed there-through such that the distal ends of the optical fibers are exposed at the front surface. A lead frame 30 is insert molded into the front surface 21 of the molded article 20 such that at least a portion of the engaging portion of each lead is contained inside the resin 20a that forms the molded article 20 and a first surface of each lead is exposed at the first surface 21. In this way, the leads 31a and 31b can be prevented from detaching from the front surface 21 of the molded article 20. Also, the lead frame 30 is cut such that a second surface of each lead 31a or 31b is exposed at a side surface 22 of the molded article 20 that is contiguous with the front surface 21 of the molded article 20. As a result, a three dimensional wiring pattern can be fabricated with ease.

The manufacturing method will now be explained in more detail. As shown in FIG. 10, the mold 50 is set by assembling the two dies 51 and 52 such that a cavity 53 for forming the molded article 20 is formed. The lead frame 30 and the second slide core 56 are mounted to the front surfaces 51a and 52a of the upper and lower dies 51 and 52 and are positioned there by the positioning pins 57. The height of the protruding part 58 is adjusted to a prescribed height and the first slide core 55 is inserted. The first slide core 55 is positioned by inserting the distal end of the core pin 54 into a core pin positioning hole 56b provided in the second slide core 56. Then, resin 20a is injected into the cavity 53 inside the mold 50 and the lead frame 30 is insert molded so as to form the molded article 20. When this is done, as described previously, the wide sections 34 of the leads 31a and 31b are contained inside the resin 20a.

When the resin 20a is injected and the insert molding of the lead frame 30 has been completed, the first slide core 55 and the second slide core are moved away from each other and the molded article 20 is removed from the mold 50. Next, the lead frame 30 insert molded in the front surface 21 of the molded article 20 is cut in accordance with the size of the front surface 21. The end faces exposed at the side surface 22 are then polished and plated with nickel followed by gold so as to form electrode terminals 36. Finally, the photoelectric conversion unit 40 is mounted to the front surface 21 of the molded article 20 such that the active layer 42 of the photoelectric conversion element 41 is positioned directly in front of the optical fiber insertion holes 24 and the electrodes 43 contact the electrical wiring pattern section 23, i.e., the leads 31a and 31b. By manufacturing the photoelectric coupling assembly 10 in this manner, the front surface 21 of the main unit 20 is formed to be slanted and the transmission properties can be improved.

As described above, in a photoelectric coupling assembly and manufacturing method thereof in accordance with the present invention, engaging portions are provided in the cross sections of the leads serving to electrically connect to the photoelectric conversion unit and the leads are insert molded into the front surface of the molded article. The leads are formed such that at least a portion of the engaging portion is contained inside the resin of the molded article. As a result, the resin can prevent the leads from becoming detached after the leads are insert molded. Also, since a portion of each of the leads is arranged such that it is exposed at a side surface that is contiguous with the front surface of the molded article, a three-dimensional electrical wiring pattern can be formed easily and reliably.

A photoelectric coupling assembly and manufacturing method thereof in accordance with the present invention can be used as a photoelectric coupling assembly and a manufacturing method for a photoelectric coupling assembly that serves to connect a plurality of optical fibers passed through insertion holes provided in a molded article to a photoelectric conversion unit provided on a front surface of the molded article such that it faces the insertion holes.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application No. 2006-284845 filed on Oct. 19, 2006 including specification, claims, drawings, and summary are incorporated herein by reference in its entirety.

What is claimed is:

1. A photoelectric coupling assembly comprising:
 a photoelectric conversion unit equipped with a photoelectric conversion element having an active layer; and
 a molded article having a main unit made of resin having
  an optical fiber insertion hole configured and arranged to have an optical fiber inserted there-through such that a distal end of the optical fiber faces the active layer of the photoelectric conversion element, the molded article having a front surface onto which the photoelectric conversion unit is mounted and a side surface that is contiguous with the front surface, and
  a lead that is insert molded into the main unit, the lead having
   a first surface that is exposed at the front surface of the main unit and electrically connected to the photoelectric conversion element,
   a second surface that is exposed at the side surface of the main unit, and
   an engaging portion having a width that increases in a direction away from the front surface with at least a portion of the engaging portion being contained inside the resin of the main unit.

2. The photoelectric coupling assembly recited in claim 1, wherein
 a thickness of the lead varies.

3. The photoelectric coupling assembly recited in claim 2, wherein
 a variation in the thickness of the lead id formed with plating.

4. The photoelectric coupling assembly recited in claim 1, wherein
 a width of the first surface varies with respect to a direction perpendicular to the width of the first surface.

5. The photoelectric coupling assembly recited in claim 1, wherein
 the lead has a hexagonal shape when viewed from the second surface.

6. The photoelectric coupling assembly recited in claim 1, wherein
 the lead has a trapezoidal shape when viewed in cross-section.

7. the photoelectric coupling assembly recited in claim 1, wherein
 a width of the lead molded within the main unit varies with respect to a direction perpendicular to the first surface.

8. A photoelectric coupling assembly comprising:
 a photoelectric conversion unit equipped with a photoelectric conversion element having an active layer; and
 a molded article having a main unit made of resin having
  an optical fiber insertion hole configured and arranged to have an optical fiber inserted there-through such that a distal end of the optical fiber faces the active layer of the photoelectric conversion element, the molded article having a front surface onto which the photoelectric conversion unit is mounted and side surface that is contiguous with the front surface, and
  a lead insert molded into the main unit such that the lead is embedded within the main unit, the lead having
   a first surface that is exposed along a portion of the front surface of the main unit and electrically connected to the photoelectric conversion element,
   a second surface that is exposed along a portion of the side surface of the main unit, and
   an engaging portion having a width that increases in a direction extending away form the front surface to an interior of the main unit with at least a portion of the engaging portion being contained inside the resin of the main unit.

9. The photoelectric coupling assembly recited in claim 8, wherein the lead has a hexagonal shape when viewed from the second surface.

10. The photoelectric coupling assembly recited in claim 8, wherein the lead has a trapezoidal shape when viewed in cross-section.

11. The photoelectric coupling assembly recited in claim 8, wherein a width of the lead molded within the main unit varies with respect to a direction perpendicular to the first surface.

* * * * *